June 3, 1924.

B. F. DAVIS

STOVE LIFTER

Original Filed Nov. 21, 1921

1,496,658

Benjamin F. Davis.
INVENTOR

BY Victor J. Evans
ATTORNEY

WITNESS:

Patented June 3, 1924.

1,496,658

UNITED STATES PATENT OFFICE.

BENJAMIN F. DAVIS, OF SPUR, TEXAS, ASSIGNOR OF ONE-FOURTH TO JAMES C. DAVIS AND ONE-FOURTH TO JOHN EMERT, BOTH OF SPUR, TEXAS.

STOVE LIFTER.

Application filed November 21, 1921, Serial No. 516,824. Renewed March 18, 1924.

*To all whom it may concern:*

Be it known that I, BENJAMIN F. DAVIS, a citizen of the United States, residing at Spur, in the county of Dickens and State of Texas, have invented new and useful Improvements in Stove Lifters, of which the following is a specification.

This invention relates to a stove lid lifter, the general object of the invention being to provide a simple device which will grip the lid in such a manner that there is no danger of the lid being released until desired.

Another object of the invention is to so form the parts that the device will be held in gripping position when grasped by the hand and will return to ungripping position as soon as the hand is opened.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
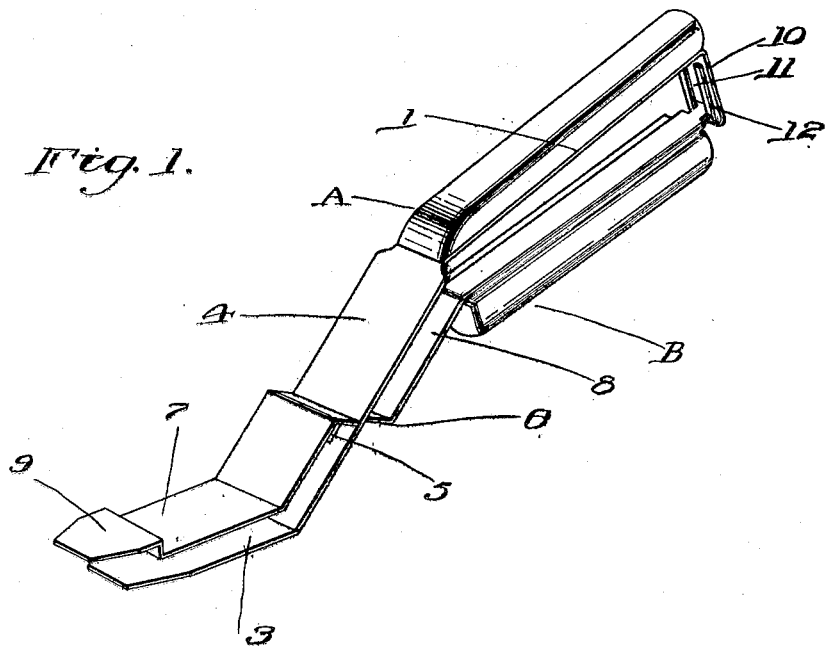
Figure 1 is a perspective view of the device.
Figure 2:
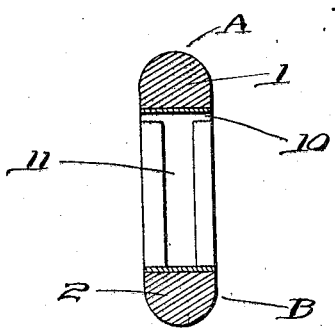
Figure 2 is a detail view.

As shown in these views the device comprises two parts A and B, each of which consists of a handle 1 and a shank 2. The shank 1 of member A is provided with a bent extremity 3 for engaging the socket in the lid and this extremity is connected with the handle by the inclined part 4. This part 4 is provided with a slot 5. The shank 2 of member B is provided with a reduced part 6 which passes through the slot 5 and then the shank is bent twice at right angles to provide the flat part 7 for engaging the lid top above the socket so as to clamp the lid between this part 7 and the extremity 3. The part 6 is connected with the handle by the inclined part 8. The part 7 has its extremity offset to provide the lip 9. The handle 1 of part A is provided with the depending part 10 which is slotted, as at 11, to receive the T-shaped projection 12 on the handle 1 of part B. These parts are so arranged that the two handles are normally spaced apart but when grasped by the hand they will be brought together and this action will cause the parts 3 and 7 of the shanks to grip the lid between them and thus securely hold the same against slipping. The lip 9 extends over the lid so as to increase the gripping surface when the handles are gripped by the hand. As soon as the hand is released the handles will drop apart thus freeing the device from the lid. The handles are preferably made of perforated aluminum or other non-heating material to prevent burning of the hand.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A stove lid lifter comprising two members each consisting of a handle part and a shank part, the shank part of one of said members being designed at a downward inclination from the handle part and being slotted intermediate of its ends, and thence provided with a bent extremity for engaging a socket in the stove lid, a depending portion carried by handle of the last mentioned member and being provided with a slot, the shank of the other member being bent at the same inclination as the first mentioned member, thence bent at an angle to pass through the slot, and further bent at the same inclination as the first bent portion and thence bent to form a lip at the extremity thereof, a T-shaped projection formed on the handle of the last mentioned member and being adapted to be received in the last mentioned slot as and for the purpose specified.

In testimony whereof I affix my signature.

BENJAMIN F. DAVIS.